Figure 1:
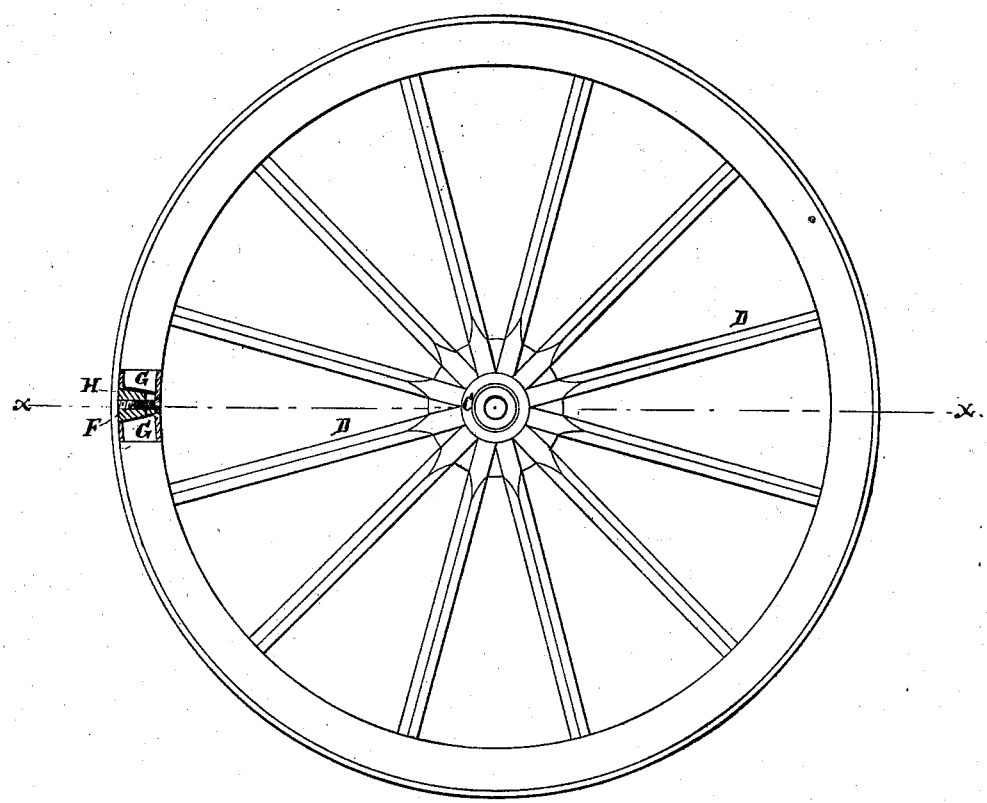

S. L. BOND.
Vehicle-Wheel.

No. 165,471.

Patented July 13, 1875.

WITNESSES:
A. Bennewendorf
A. F. Terry

INVENTOR:
S. L. Bond
BY Munn
ATTORNEYS.

UNITED STATES PATENT OFFICE.

SOBIESKI L. BOND, OF COLUMBIA, SOUTH CAROLINA.

IMPROVEMENT IN VEHICLE-WHEELS.

Specification forming part of Letters Patent No. 165,471, dated July 13, 1875; application filed May 1, 1875.

*To all whom it may concern:*

Be it known that I, SOBIESKI L. BOND, of Columbia, in the county of Richland and State of South Carolina, have invented a new and useful Improvement in Wagon-Wheels, of which the following is a specification:

The invention will first be fully described in connection with the drawing, and then pointed out in the claim.

Figure 2:
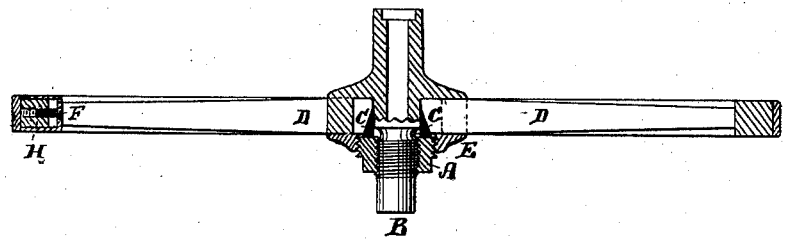

Figure 1 is a side elevation of my improved wheel. Fig. 2 is a transverse section taken on the line $x\,x$ of Fig. 1.

Similar letters of reference indicate corresponding parts.

A is the nut, screwing on the outer part B of the hub, against keys C under the spokes D, to wedge them out for tightening the tire. E is the face-plate, screwing on the nut against the sides of the spokes, to wedge them firmly in the mortises of the hub. F is the wedge between the ends G of the felly, and H is the screw for drawing it up to fill up the opening made by wedging out the spokes and tightening the felly.

The wheel can thus be tightened up as often as required merely by turning the screws with proper wrenches.

Having thus described my invention, I claim as new and desire to secure by Letters Patent—

The combination of the threaded extension B, the internally and externally threaded nut A, screwed thereon against wedges C, and the face-plate E, screwed on the nut and against the spokes D, all constructed and arranged substantially as and for the purpose specified.

SOBIESKI L. BOND.

In presence of—
 NATHANIEL BARNWELL,
 CHARLES F. JANNEY.